United States Patent Office 3,106,454
Patented Oct. 8, 1963

3,106,454
PREPARATION OF DIBORANE
Peter R. Girardot, Middleton, Wis., assignor to Callery Chemical Company, Pittsburgh, Pa., a corporation of Pennsylvania
No Drawing. Filed Oct. 31, 1955, Ser. No. 544,025
8 Claims. (Cl. 23—204)

This invention relates to a new and improved method for the preparation of diborane and in particular it relates to the preparation of diborane from alkali metal borohydrides such as sodium borohydride, and dialkyl sulfates such as dimethyl sulfate, in the presence of polyethylene glycol dialkyl ethers.

Several methods for the preparation of diborane have been described in the literature, some of which have been patented. One of these methods involves the reaction of boron trifluoride with sodium borohydride to yield diborane and sodium fluoborate. This method of preparation is undesirable because part of the boron is lost in the by-product and is difficult, if not impossible, to recover economically. Another method for preparing diborane is the reaction of boron trifluoride etherate with lithium hydride. The main disadvantages of this method for large scale purposes are the limited supply of lithium and the difficulty of recovering lithium from the lithium fluoride which is formed as a by-product. Still another method of preparing diborane which has been reported is the reaction of boron trichloride with lithium hydride. This reaction results in low yields of diborane but is of interest because lithium can be more readily recovered from the lithium chloride formed than from lithium fluoride. No method has yet been reported which utilizes the reaction of an alkali metal borohydride with a dialkyl sulfate to produce diborane.

It is one object of this invention to provide a new and improved method for preparing diborane.

Another object is to provide a convenient and economical method for the preparation of diborane by the reaction of an alkali metal borohydride with a dialkyl sulfate in the presence of a polyethylene glycol dialkyl ether.

A third object is to provide a new and useful method for preparing diborane by the reaction of sodium borohydride with dimethyl sulfate in the presence of diethylene glycol dimethyl ether.

Other objects will appear throughout the following specification and appended claims.

This new and improved method for preparing diborane will be more fully described hereinafter and the novelty thereof will be particularly pointed out and distinctly claimed.

The present invention is based upon the discovery that diborane can be produced in relatively good yield according to one or both of the following reactions:

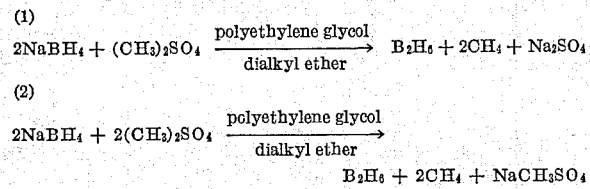

Any alkali metal borohydride and any lower dialkyl sulfate may be used in the above reactions with equal effectiveness but sodium borohydride and dimethyl sulfate are preferred since they are the cheapest and most readily available starting materials and therefore the most economical. When dimethyl sulfate is used in equimolar quantities with the borohydride as shown in Reaction 2, a substantially quantitative yield of diborane results. The sodium methyl sulfate formed can be thermally decomposed to recover dimethyl sulfate as follows:

$$2NaCH_3SO_4 \rightarrow (CH_3)_2SO_4 + Na_2SO_4$$

The preferred type of ether is a polyethylene glycol dialkyl ether having the general formula $RO(C_2H_4O)_nR$ where $n$ is an integer from 1 to 4 and R is a lower alkyl group, as for example diethylene glycol dimethyl ether or tetraethylene glycol dimethyl ether.

In one experiment, diborane was prepared as follows: a solution of $NaBH_4$ in tetraethylene glycol dimethyl ether (20 ml. of solvent containing 22.6 mmols of $NaBH_4$) was added dropwise at 25° C. to a stirred sample of $(CH_3)_2SO_4$ (1.5 ml. or 11.3 millimols) in a conventional high vacuum system. The addition took 30 minutes in order to prevent an increase in temperature due to the heat of reaction. Copious quantities of gas were evolved and the condensable gas was collected in a cold trap at −196° C. A white solid, presumably $Na_2SO_4$, precipitated during the addition. The non-condensable gases were methane and hydrogen. The condensable gas was identified as diborane by its vapor pressure and molecular weight. The yield of diborane was 69.8% of the theoretical based on the amount of $NaBH_4$ used.

In another experiment, a much better yield of diborane was obtained by using the following procedure. In a 100 ml., 3-necked flask fitted with a dropping funnel, nitrogen inlet, thermometer and magnetic stirrer was placed 41.3 mmols of $NaBH_4$ and 20 ml. of diethylene glycol dimethyl ether. The reaction flask was connected to a series of cold traps maintained at −196° C. which were in turn provided with a vacuum source and a mercury trap vent. The system was flushed with nitrogen and 44.5 mmols of dimethyl sulfate were added from the dropping funnel in one hour at a temperature of 25–35° C. with constant stirring. A slow stream of nitrogen was maintained throughout the system during the reaction. A total of 29.2 mmols of condensable gas was collected in the cold traps which was identified as diborane. The yield was 91% of theoretical based on the $NaBH_4$ used. This experiment showed conclusively that most of the diborane produced by the reaction could be isolated simply by sweeping the reactor with an inert gas for a short period of time.

In other experiments which were carried out at temperatures as high as 250° C. and pressures up to 325 p.s.i.g. large yields of methane and low yields of diborane were obtained. Thus, the ideal conditions for this method of preparing diborane are a temperature of 25–35° C., atmospheric pressure, and a 1:1 molar ratio of alkali metal borohydride to dialkyl sulfate. Under these conditions, the reaction proceeds smoothly at room temperature and is accompanied by considerable evolution of heat.

The use of dialkyl sulfate such as dimethyl sulfate possesses several distinct advantages over boron halides for displacing diborane from an alkali metal borohydride. These advantages are: (1) dimethyl sulfate is commercially available at a lower price than boron halides, (2) the dialkyl sulfates are relatively non-corrosive, non-volatile liquids which can be handled more conveniently than the boron halides, (3) the reaction can be carried out more rapidly without additional heating, (4) no boron is lost in the formation of by-products.

Having thus described two specific embodiments of this invention, it will be apparent to those skilled in the art that other modifications are possible. Thus, it should be understood that within the scope of the appended claims, this invention may be practiced otherwise than as specifically described.

What I desire to claim and secure by Letters Patent of the United States is:

1. A method of preparing diborane which comprises reacting an alkali metal borohydride with a lower dialkyl sulfate in the presence of a polyether having the general formula $RO(C_2H_4O)_nR$, where $n$ is a small integer and R is a lower alkyl group, and recovering the diborane thus formed.

2. A method according to claim 1 in which the alkali metal borohydride is sodium borohydride and the dialkyl sulfate is dimethyl sulfate.

3. A method according to claim 1 in which R is $CH_3$ and $n$ is an integer from 1 to 4.

4. A method according to claim 1 in which the reaction is carried out at room temperature and atmospheric pressure.

5. A method according to claim 1 in which the molar ratio of alkali metal borohydride to dialkyl sulfate is within the range of 1:1 to 2:1.

6. A method according to claim 1 in which an inert gas is passed through the reaction mixture to sweep out the diborane formed.

7. A method of preparing diborane which comprises reacting sodium borohydride with dimethyl sulfate in a 1:1 molar ratio in the presence of a substantial amount of diethylene glycol dimethyl ether at a temperature of 25–35° C. and atmospheric pressure in a nitrogen atmosphere and recovering the diborane evolved by condensation.

8. A method of preparing diborane which comprises reacting an alkali metal borohydride with a lower dialkyl sulfate in the presence of a polyethylene glycol dialkyl ether having the general formula $RO(C_2H_4O)_nR$, where $n$ is an integer from 2 to 4 and R is a lower alkyl group.

References Cited in the file of this patent

Metal Hydrides, Inc., Bulletin 502A on $NaBH_4$, 2 pages, received in Patent Office February 15, 1950.